United States Patent [19]

King

[11] Patent Number: 5,780,094
[45] Date of Patent: Jul. 14, 1998

[54] SPORTS DRINK

[75] Inventor: Roderick Frederick Gerardus Joseph King, Otley, United Kingdom

[73] Assignee: Marathade, Ltd., Leeds, England

[21] Appl. No.: 693,146

[22] PCT Filed: Feb. 16, 1995

[86] PCT No.: PCT/GB95/00331

§ 371 Date: Nov. 1, 1996

§ 102(e) Date: Nov. 1, 1996

[87] PCT Pub. No.: WO95/22260

PCT Pub. Date: Aug. 24, 1995

[30] Foreign Application Priority Data

Feb. 16, 1994 [GB] United Kingdom ............... 9402950

[51] Int. Cl.$^6$ ............................ A23L 2/60; A23L 2/68
[52] U.S. Cl. ................... 426/590; 426/658; 426/804; 426/810
[58] Field of Search ........................ 426/590, 658, 426/810, 804

[56] References Cited

U.S. PATENT DOCUMENTS

| | | | |
|---|---|---|---|
| 4,038,421 | 7/1977 | Mendy et al. | 426/590 |
| 4,042,684 | 8/1977 | Kahm | 426/590 |
| 4,309,417 | 1/1982 | Staples | 426/590 |
| 4,312,856 | 1/1982 | Korduner et al. | 426/590 |
| 5,032,411 | 7/1991 | Stray-Gundersen | 426/590 |

FOREIGN PATENT DOCUMENTS

| | | |
|---|---|---|
| 0202106 | 11/1986 | European Pat. Off. |
| 2310708 | 12/1976 | France. |
| 3811964 | 10/1989 | Germany. |
| 05276904 | 1/1994 | Japan. |

*Primary Examiner*—Helen Pratt
*Attorney, Agent, or Firm*—Beyer & Weaver, LLP

[57] ABSTRACT

A sports drink comprises an aqueous solution including a saccharide selected from: galactose, a galactose containing disaccharide or oligosaccharide, sorbitol, lactose, fructose or mixtures thereof and optionally including not more than 1.25% w/v of glucose.

7 Claims, No Drawings

SPORTS DRINK

This invention relates to a non-alcoholic beverage particularly but not exclusively for use as a sports drink, especially for use by participants in endurance sports or activities.

Exercise acts to deplete the body of fuel stores and increases the rate of perspiration causing loss of water and mineral salts. These losses can be significant if exercise is prolonged and particularly if ambient temperatures are moderate or high. Losses of water and salts may not be a problem to a person engaging in light exercise for short periods, particularly if a normal eating and drinking pattern has been maintained prior to the exercise. However the losses can be significant if the exercises are heavy and prolonged such that the depletion of energy and loss of water and salts are not within a person's usual tolerances. Tiredness and dehydration may act to limit or restrict performance.

The efficacy and timing of replacement of liquids and metabolites during and immediately after exercise is of importance. Repletion of some or all of the lost energy, water and salts will not only restore the body to its normal balance but can enhance and restore performance. This is particularly relevant for competitive sports or activities such as cycle racing and football wherein fatigue is a primary limiting factor for overall performance. The glycogen content of liver and muscle is crucial to endurance and stamina. For this reason restoration of glycogen levels or limitation of glycogen losses will enable a person to sustain exercise for a longer period. The maintenance of correct hydration and adequate glycogen content of liver and muscle are crucial to endurance and stamina. Prevention of significant dehydration and the restoration of glycogen levels or limitation of glycogen losses enables a person to sustain exercise for a longer period. Sports drinks containing inorganic salts to replace those lost as sweat are well established. Drinks having a high concentration of sugar are also common but a high sugar content may afford a solution having a high osmolality, preventing the fluid from rapidly entering a person's body from the stomach. Indeed fluid may be drawn in the opposite direction. Sports drinks containing a high concentration of sugar are not effective.

U.S. Pat. No. 4,038,421 discloses a non-alcoholic drink incorporating galactose at high concentrations which finds application in building of tissue and which avoids a tendency to hyperglycaemia. Tissue formation is a long-term process and such a drink would not find application in rapid rehydration or energy production as a sports drink.

According to the present invention a sports drink comprises an aqueous solution including a saccharide selected from: galactose, a galactose containing disaccharide or oligosaccharide, sorbitol, lactose, fructose or mixtures thereof; optionally including not more than 2.5% w/v glucose.

Preferably the drink contains not more than 1.25% w/v glucose.

The saccharide of the present invention can be used as a source for either glucose or glycogen in the liver. Galactose is a naturally occurring hexose and uses an effective sodium co-transport system for GI tract absorption.

The drink of the present invention can be rapidly absorbed to give efficient rehydration. The saccharides give energy and directly enhance the glycogen reserves in the liver and skeletal muscle.

Drinks in accordance with this invention may also include inorganic salts in proportions and amounts suitable to replenish salts lost in sweat.

The concentration of the saccharide (as monosaccharide) may lie in the range of 0.5 to 5.0% w/v, preferably 2.5% w/v. In preferred embodiments of the invention the combined osmolality of the saccharide(s), the electrolytes and other ingredients lies within the range of 150 to 280 mosm.kg$^{-1}$, preferably 240 mosm.kg$^{-1}$.

In the case of disaccharides or oligosaccharides the concentration may lie in the range 2.0 to 15.0% w/v to a total solution osmolality of 230 mosm.kg$^{-1}$ at which the carbohydrates supply 140 mosm.kg$^{-1}$. The unit mosm.kg$^{-1}$ is equivalent to the unit mmol.kg$^{-1}$.

Preferred drinks contain sodium preferably in an amount of 25 to 45 mmol.l$^{-1}$, more preferably 25 to 35 mmol.l$^{-1}$.

Small bowel absorption is most rapid at specific sodium and carbohydrate concentrations. Preferred drinks of the present invention have an optimised sodium/carbohydrate content to satisfy this requirement for sodium co-transport and water absorption.

Glucagon is the counter regulatory hormone to insulin and is responsible for catabolic drive. Glucose ingestion results in an inhibition of glucagon secretion. The drink of the present invention does not cause a reduction in glucagon response as does glucose. For this reason disturbance of existing catabolic drive is reduced. In addition the drink is associated with reduced insulin response.

Drinks in accordance with this invention may also include citric acid or citrate to enhance the flavour and also to maintain the pH in the range 2.0 to 6. Natural or artificial flavourings, for example fruit flavourings may be employed. Preservatives, such as sodium benzoate or sorbic acid may be included. The drink may be carbonated or still. Caffeine or other additives may be incorporated. Ascorbic acid may be added as an anti-oxidant.

Especially preferred embodiments of the invention incorporate galactose, di or oligosaccharides incorporating galactose or mixtures of the foregoing with glucose or other sugars.

The invention is further described by means of example but not in any limitative sense.

EXAMPLE 1

A sports drink incorporates the following ingredients.

| INGREDIENT QTY | per l | mmol/l | mosm/l | mosm/kg | Energy KJ |
|---|---|---|---|---|---|
| Galactose 2.5 g/100 ml | 25 g | 139 | 139 | 141 | 400 |
| Sodium Chloride 0.2 g/100 ml | 2 g | 34 | 68 | 69 | — |
| Potassium Dihydrogen orthophosphate 0.04 g/100 ml | 0.4 g | 2.9 | 8.7 | 9 | — |
| Magnesium Chloride 0.01 g/100 ml | 0.1 g | 1.2 | 3.6 | 4 | — |
| TOTALS | 27.5 g solids | | | 219.3 mosm/l | |

(27.5–30.5 g including citrate but not flavours or preservatives).

Osmolality approx. 223 mosm/kg (222–238 inc. citrate) Citric acid or citrate may be used in an amount of 0.1 to 0.5% w/v as needed. When sodium citrate is used the quantity of sodium chloride may be reduced in exact molar proportion to the sodium ions added as sodium citrate (up to 34 mmol.l$^{-1}$). In this specification proportions are by weight unless indicated otherwise.

Caffeine and natural or synthetic flavourings such as orange, blackcurrant, lemon or lime, may be incorporated as desired. Preservatives, for example sodium benzoate or sorbic acid may be employed. Ascorbic acid may be used as an anti-oxidant in an amount to 0.5% w/v as needed. The proportions set out above may be varied by ±25%.

EXAMPLE 2

The drink of Example 1 was prepared with the galactose being replaced by a mixture of galactose and glucose in a total amount of 25 $gl^{-1}$.

EXAMPLE 3

Example 1 was repeated but the galactose was replaced with a mixture of galactose and lactose or hydrolysed lactose in an amount of 25 $gl^{-1}$.

EXAMPLE 4

Example 1 was repeated with the galactose replaced with a mixture of galactose and fructose in a total amount of 25 $gl^{-1}$.

EXAMPLE 5

Example 1 was repeated using a disaccharide or oligosaccharide or a mixture of either or both with galactose in a total amount of 25 $gl^{-1}$.

EXAMPLE 6

Example 5 was repeated using a disaccharide or oligosaccharide comprising galactose in conjunction with glucose or lactose or fructose to a total amount of 25 $gl^{-1}$.

EXAMPLE 7

Example 5 was repeated using a disaccharide or oligosaccharide of galactose or a mixture of either or both with galactose to a total solution osmolality of 222 $mosm/kg^{-1}$ of which the carbohydrates provided an osmolality of 140 $mosm/kg^{-1}$ but not exceeding a total carbohydrate concentration of 150 $gl^{-1}$.

EXAMPLE 8

Example 5 was repeated using a disaccharide or oligosaccharide of galactose in conjunction with glucose, lactose, fructose or galactose to afford a total solution osmolality of 222 $mosm/kg^{-1}$ wherein the carbohydrates provided 140 $mosm/kg^{-1}$ but not exceeding a total carbohydrate concentration of 150 $gl^{-1}$.

EXAMPLE 9

Example 1 was repeated with the galactose replaced with lactose in an amount of 50 $gl^{-1}$.

EXAMPLE 10

Example 2 was repeated with a mixture of sorbitol and galactose in an amount of 25 $gl^{-1}$.

I claim:

1. A sports drink comprising an aqueous solution including a saccharide selected from the group consisting of galactose, a galactose containing disaccharide or oligosaccharide and mixtures thereof, 25 to 45 $mmol.l^{-1}$ of sodium, and optionally including not more than 2.5% w/v of glucose, wherein the total concentration of saccharide is 0.5 to 5.0% w/v and wherein the combined monosaccharide osmolality is 150 to 280 $mosm.kg^{-1}$.

2. A drink as claimed in claim 1 wherein the concentration of monosaccharide is 0.5 to 5.0% w/v.

3. A drink as claimed in claim 2, wherein the concentration of monosaccharide is 2.5% w/v.

4. A drink as claimed in claim 1, wherein the combined monosaccharide osmolality is 140 $mosm.kg^{-1}$.

5. A drink as claimed in claim 1, wherein the concentration of disaccharide and oligosaccharide is 2.0 to 15.0% w/v.

6. A drink as claimed in claim 5, wherein the total solution osmolality is up to 230 $mosm.kg^{-1}$ at which the carbohydrate contribution to osmolality is up to 140 $mosm.kg^{-1}$.

7. A drink as claimed in any preceding claim including not more than 1.25% w/v of glucose.

* * * * *